March 31, 1959  C. H. YOHE  2,880,298
ELECTRIC HEATING UNITS
Filed June 2, 1958
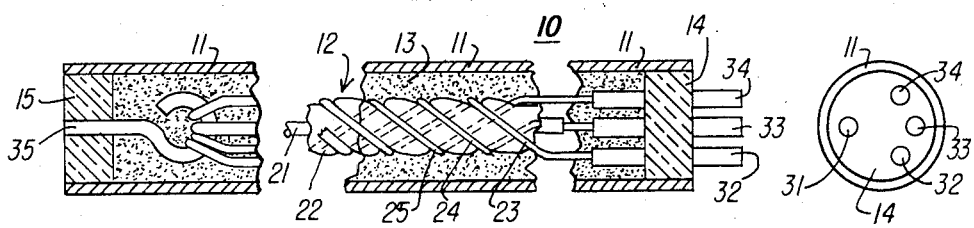
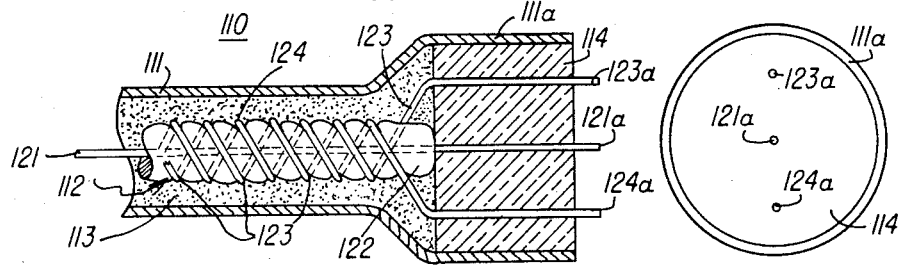
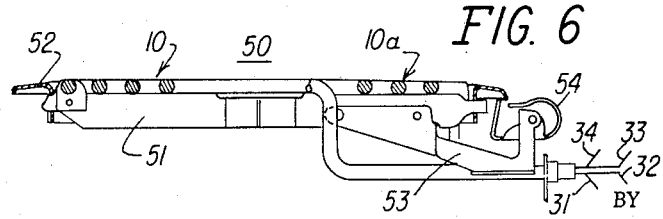
INVENTOR.
CHARLES H. YOHE
BY
Smith, Prangley, Baird & Clayton
ATTYS.

United States Patent Office 2,880,298
Patented Mar. 31, 1959

2,880,298

ELECTRIC HEATING UNITS

Charles H. Yohe, Glen Ellyn, Ill., assignor to General Electric Company, a corporation of New York Application June 2, 1958, Serial No. 739,379

4 Claims. (Cl. 201—67)

The present invention relates to electric heating units, and more particularly to such units employed in the production of electric hotplates for electric ranges, or the like. This application is a division of the copending application of Charles H. Yohe, Serial No. 517,290, filed June 22, 1955.

In carrying out automatic cooking operations on an electric range, it is highly desirable to employ an electric hotplate that comprises an electric heating unit incorporating an arrangement of the electric heating elements therein that permits of considerable selectivity in the energization thereof so as to obtain the corresponding selectivity in the production of heat at the required rates, while maintaining small the total mass of the heating unit, so as to avoid the temperature-time lag inherent in a heating unit of large mass.

Accordingly, it is a general object of the invention to provide an electric hotplate incorporating an electric heating unit of the sheathed resistance conductor type and of the specification noted.

Another object of the invention is to provide an electric heating unit embodying an improved arrangement of the elements thereof so as to achieve great selectivity in the production of heat at the required rates, while preserving compactness of the structure thereof.

Another object of the invention is to provide an electric heating unit of the character described, that incorporates an improved arrangement of a number of heating elements in the sheath that may be selectively energized, while maintaining small the diameter of the sheath, so as to avoid the temperature-time lag inherent in a heating unit provided with a sheath of large diameter.

A further object of the invention is to provide an electric heating unit of the type described, and involving an improved arrangement of a heater assembly incorporated on the enclosing sheath thereof, wherein the construction of the heater assembly may be selectively varied to effect the production of a corresponding wide variety of finished heating units, and without any substantial variation of the remaining components of the heating units or in the steps of making the same, whereby great manufacturing simplicity and economy are achieved.

A further object of the invention is to provide an electric heating unit of the character described, that incorporates a supporting core or mandrel carrying one or more electric resistance conductors of helical form, wherein the core is formed of filaments of electrical-insulating material.

A still further object of the invention is to provide a heater assembly for an electric heating unit of the character described, wherein the material of the core mentioned consists essentially of silica, also containing non-siliceous metal oxides, the ratio of the silica to the metal oxides being in excess of 9, and having a melting point in excess of 1950° F.

Further features of the invention pertain to the particular arrangement of the elements of the electric heating unit, whereby the above-outlined and additional operating features thereof are attained.

The invention, both as to its organization and method of operation, together with further objects and advantages thereof, will best be understood by reference to the following specification, taken in connection with the accompanying drawing, in which:

Figure 1 is a fragmentary longitudinal sectional view of an electric heating unit embodying the present invention;

Fig. 2 is an end view of the terminal end of the heating unit of Fig. 1;

Fig. 3 is a fragmentary longitudinal sectional view of an end portion of a modified form of the electric heating unit;

Fig. 4 is an end view of a terminal end of the heating unit of Fig. 3;

Fig. 5 is a plan view of an electric hotplate incorporating the electric heating unit shown in Fig. 1; and Fig. 6 is a vertical sectional view of the hotplate, taken in the direction of the arrows along the line 6—6 in Fig. 5.

Referring now to Figs. 1 and 2 of the drawing, the electric heating unit 10 there illustrated, and embodying the features of the present invention, is of the sheathed resistance conductor type, and is especially designed for use in the production of an electric hotplate of the character employed in an electric range, or the like, as shown in Figs. 5 and 6. Specifically, the heating unit 10 comprises an elongated tubular metallic sheath 11 enclosing an elongated compressible heater assembly 12, as well as an elongated tubular dense layer 13 of electrical-insulating and heat-conducting material, the layer 13 embedding the heater assembly 12 and retaining the same in a highly compressed state and maintaining the same in spaced relation with respect to the sheath 11. In the arrangement, the sheath 11 may be formed of a nickel-chromium-iron alloy, one such alloy comprising approximately 14% chromium, 6% iron and the remainder chiefly nickel; while the layer 13 preferably comprises a highly compacted granular material consisting essentially of a refractory metal oxide, such, for example, as magnesium oxide.

More particularly, the heater assembly 12 comprises an elongated substantially centrally disposed lead conductor 21, an elongated tubular sleeve 22 of electrical-insulating material surrounding the lead conductor 21 and supported thereby and a plurality of elongated helical resistance conductors 23, 24 and 25 wound upon and supported by the sleeve 22. More particularly, the sleeve 22 is in the form of a bundle of filaments of electrical-insulating material, and the three resistance conductors 23, 24 and 25 are interwound in trifilar relation upon the sleeve 22, so that between each two adjacent turns of any one of the resistance conductors, there is disposed a turn of each other of the resistance conductors, the filaments of the sleeve 22 possessing sufficient resiliency that they are substantially compressed below the turns of the resistance conductors 23, 24 and 25 and protrude somewhat into the spaces between adjacent convolutions of the resistance conductors 23, 24 and 25 in order to maintain the fixed spacings of the resistance conductors 23, 24 and 25. Of course, the insulating sleeve 22 also maintains the centrally disposed lead conductor 21 in spaced-apart relation with respect to the resistance conductors 23, 24 and 25.

The fibers of the sleeve 22 are formed of siliceous material and essentially comprise glass fibers from which a preponderance of the glass-forming metal oxide constituents have been leached; and the product "Refrasil" manufactured by the H. I. Thompson Company is quite satisfactory. This product is formed by leaching type E glass fibers with a mineral acid (preferably HCl or HNO₃) for several hours at an elevated temperature, which product has a softening point of about 2350° F., and a melting point somewhat in excess of 3000° F.; and a typical composition of this product is as follows:

| | Percent |
|---|---|
| Silica ($SiO_2$) | 95.68 |
| Aluminum oxide ($Al_2O_3$) | 1.43 |
| Titanium oxide ($TiO_2$) | 0.08 |
| Iron oxide ($Fe_2O_3$) | 0.09 |
| Calcium oxide (CaO) | Nil |
| Magnesium oxide (MgO) | 0.08 |
| Alkali as sodium oxide ($Na_2O$) | 0.32 |
| Boric anhydride ($B_2O_3$) | Nil |
| | 97.68 |

The 2.32%, unaccounted for, includes some water of hydration, some water of absorption, some uncombusted carbonaceous residue, some undetermined impurities present in the original glass mix, and minor analytical errors.

A suitable type E glass fiber that may be leached is the product "ECC–11 Fiberglas" manufactured by the Owens-Corning Fiberglas Corporation. This product formed of type E glass has a softening point of about 1100° F. and a melting point of about 1400° F.; and a typical composition of this product is as follows:

| | Percent |
|---|---|
| Silica ($SiO_2$) | 53.76 |
| Aluminum oxide ($Al_2O_3$) | 15.29 |
| Titanium oxide ($TiO_2$) | 0.08 |
| Iron oxide ($Fe_2O_3$) | 0.23 |
| Calcium oxide (CaO) | 16.80 |
| Magnesium oxide (MgO) | 5.10 |
| Alkali as sodium oxide ($Na_2O$) | 0.42 |
| Boric anhydride ($B_2O_3$) | 6.60 |
| | 98.28 |

The 1.72%, unaccounted for, includes some uncombusted carbonaceous residue, some undetermined impurities present in the original glass mix, and minor analytical errors.

More particularly, the leached glass product specified may be produced from the original glass product specified by leaching the original product with HCl of about 11.2% initial concentration at a temperature of about 140° F., for about five hours. Thereafter, the acid-leached product is washed acid-free, air-dried, and then fired at about 1700° F., for about eight hours. It will be appreciated that in the leaching step a preponderance of the glass-forming metal-oxide constituents are extracted, so that in the final product the ratio of the silica to the small remaining glass-forming metal-oxide constituents is substantially greater than 9; whereby the final product is substantially pure silica. The details of the method generally described above for leaching the original product specified in order to produce the final product specified are disclosed in U.S. Patent No. 2,491,761, granted on December 20, 1949 to Leon Parker and Alexander Cole.

Alternatively, the siliceous filaments of the resilient layer 22 may comprise the product "Fiberfrax" manufactured by the Carborundum Company, or the product "RF800" manufactured by Johns-Manville Company; however, the "Refrasil" product initially specified is exceedingly satisfactory, as it comprises substantially 96% pure silica and possesses the exceedingly high softening and melting points previously noted.

Also the heating unit 10 comprises four electrical terminals 31, 32, 33 and 34 and respectively connected to the adjacent ends of the lead conductor 21 and the three resistance conductors 23, 24 and 25; which terminals 31, 32, 33 and 34 are arranged in mutually spaced-apart relation and project longitudinally from the corresponding right-hand end of the sheath 11 and are embedded in an associated electrical insulating plug 14 closing the right-hand end of the sheath 11. Further, the heating unit 10 comprises an electrical connector 35 in the form of an eye bolt arranged in the left-hand end of the sheath 11 and commonly terminating the adjacent left-hand ends of the lead conductor 21 and the resistance conductors 23, 24 and 25. The eye bolt 35 is arranged in spaced-apart relation with respect the adjacent left-hand end of the sheath 11 and anchored in place in an associated electrical insulating plug 15 closing the left-hand end of the sheath 11. In the arrangement, the left-hand ends of the electrical elements 21, 23, 24 and 25 may be welded or otherwise secured to the adjacent end of the eye bolt 35, but normally they may be suitably frictionally connected thereto.

In the arrangement, the lead conductor 21 is normally formed of basic steel stock; the resistance conductors 23, 24 and 25 may be formed of a suitable nickel-chromium alloy, such, for example, as the alloy comprising 80% nickel and 20% chromium; the plugs 14 and 15 may be formed of a compressed mass of refractory metal oxide, such, for example, as magnesium oxide, and the electrical terminals 31, 32, 33 and 34 and the eye bolt 35 may be formed of a basic steel stock. If desired, the extremities of the electrical terminals 31, 32, 33 and 34 may be provided with a thin nickel coating to facilitate the completion of exterior electrical connections.

In view of the foregoing, it will be appreciated that in the heating unit 10, the resistance conductors 23, 24 and 25 are mutually electrically insulated from each other and from the lead conductor 21 and from the sheath 11 and are respectively connected between the individual electrical terminals 32, 33 and 34 and the common electrical eye bolt 35 and thus via the common lead conductor 21 to the electrical terminal 31.

As an illustrative embodiment of the heating unit 10, the sheath 11 may have a diameter of about 0.270"; the resistance conductors 23, 24 and 25 may comprise suitable lengths of #30 gauge resistance wire; the lead conductor 21 may comprise a suitable length of a substantially heavier steel wire; and the total number of turns of the resistance wires per inch of the sleeve 22 may be in the general range 22 to 28 in order to provide suitable spaces therebetween. For example, each of the resistance conductors 23, 24 and 25 may develop a wattage of about 416 watts when a voltage of 236 volts, single-phase, A.-C. is applied between the common terminal 31 and the corresponding terminals 32, 33 and 34. The arrangement is very advantageous as it permits of great flexibility with respect to the wattage that may be developed by the heating unit 10 by appropriate connection of the different resistance conductors 23, 24 and 25 in series and parallel relationships with respect to a normal 3-wire Edison source of power supply, as previously noted.

When the electric heating unit is developing its full rate wattage of 1250 watts, the sheath 11 may have a temperature of about 1550° F. and the heating elements 23, 24 and 25 may have a temperature of about 1750° F.; whereby the temperature of the sleeve 22 may be in the vicinity of 1750° F. However, this temperature is well below the softening temperature (2350° F.) of the siliceous material of the sleeve 22; whereby the assembly 12 remains in its solid state and in its highly compressed condition, as previously explained.

Considering now the method of making the electric heating unit 10, the heater assembly 12 is first produced. Specifically, the layer or sleeve 22 of insulating material is first applied to the lead conductor 21; and this may be accomplished by braiding, knitting, wrapping, etc.; and then the heating elements 23, 24 and 25 are produced by tightly wrapping suitable lengths of the resistance wire in trifilar relation around and along the length of the sleeve 22; the heating elements 23, 24 and 25 being wrapped simultaneously employing the resilient sleeve 22 as a mandrel or arbor, so as to provide the elongated helical arrangement of the heating elements 23, 24 and 25 in spaced-apart relation. The left-hand ends of the lead conductor 21 and the resistance conductors 23, 24 and 25 are then commonly secured to the eye bolt 35 and the right-hand ends of the lead conductor 21 and the resistance conductors 23, 24 and 25 are respectively connected to the terminals 31, 32, 33 and 34. At the terminals 31, 32, 33 and 34, welding may be employed, if desired, although this is not ordinarily necessary. Specifically, the welding step, if employed, may be carried out in the manner disclosed in U.S. Patent No. 2,546,315, granted on March 27, 1951 to Sterling A. Oakley.

The heater assembly 12 is then arranged within a suitable length of the tubular sheath 11, and one end of the sheath 11 is closed by a cooperating plug or fixture, not shown, that also secures the associated electrical terminal or terminals in place. For example, the metal plug mentioned may be arranged in the end of the sheath 11 from which the electrical terminals 31, 32, 33 and 34 project; whereby the plug mentioned retains the terminals 31, 32, 33 and 34 in spaced-apart relation mutually with respect to each other and with respect to the adjacent end of the sheath 11. This assembly is then transferred to a combined loading and tamping machine of the general character of that disclosed in U.S. Patent No. 2,316,659, granted on April 13, 1943, wherein the assembly is retained in an upright position with the metal plug mentioned at the bottom of the assembly, and the granular material 13 is charged into the open top end of the sheath 11 and tamped in place. The combined machine of the Andrews patent progressively charges the material 13 into the top of the sheath 11 about the heater assembly 12 in a substantially central position with respect to the sheath 11 and tamps the material 13 in place into a firm annular layer disposed between the sheath 11 and the heater assembly 12, and embedding the heater assembly 12 and compressing the same to a limited extent. After the sheath 11 has ben completely filled with the material 13, the assembly is removed from the combined machine mentioned, and the upper end of the sheath is closed by a metal plug, not shown; whereby the assembly is ready for final compression of the heater assembly 12 and the material 13.

Preferably, these operations are carried out in a rolling machine of the general character of that disclosed in U.S. Patent No. 2,677,172, granted on May 4, 1954 to Sterling A. Oakley. More particularly, the assembly is subjected to a plurality of successive gradual cold rolling passes employing a corresponding plurality of oval rolling stages arranged in vertical alignment and alternately angularly rotated through an angle of approximately ninety degrees to prevent finning of the sheath 11. In passing it is noted that the last-mentioned Oakley patent also disclosed the arrangement of the previously mentioned metal plugs in the opposite ends of the sheath 11 to prevent loss of the material 13 and displacement of the electrical terminals 31, 32, 33, 34 and 35 during the carrying out of this cold working step. Specifically in this step the diameter of the sheath 11 is substantially reduced (normally about 10%) so as to effect substantial compression of the heater assembly 12 and the material 13, and reduction of the granular form of the material 13 into a hard, dense, rocklike mass. For example, a sheath 11 having an initial outside diameter of 0.312" is normally cold worked, in the maner described, so that it has a final diameter of 0.270", with a corresponding reduction of the diameter of the heater assembly 12.

Thereafter, the metal plugs mentioned are removed from the opposite ends of the sheath 11, and the insulating plugs 14 and 15 are secured in place to produce the finished electric heating unit 10, as shown in Figs. 1 and 2.

The above-described method is particularly well-suited to the manufacture of heating units of the sheathed type that are of small mass and comprise sheaths of very small diameter. For example, employing the present method, it is entirely feasible to manufacture such a heating unit having a sheath of only 0.125" outside diameter, even though it comprises a plurality of helical heating elements. In this embodiment, the wall of the sheath has a thickness of about 0.010"; the heater assembly has a diameter of about 0.035"; and the spacing between the sheath and the heater assembly is about 0.035". This heating unit has a very small mass and an exceedingly fast response to energization and de-energization, since the mass thereof is greatly minimized.

Referring now to Figs. 5 and 6, the electric hotplate 50 there illustrated is a 6" unit of 1250 watts rating and incorporates the electric heating unit 10, shown in Figs. 1 and 2, and provided with a sheath having an outside diameter of 0.270", the heating unit 10 being wound in spiral form and then flattened to provide the substantially planar surface or platform 10a adapted removably to support a cooking vessel, or the like. Further, the hotplate 50 comprises a spider 51 supporting the heating unit 10 and carrying a surrounding trim ring 52, together with hinge mechanism including two pivotally connected hinge elements 53 and 54. The hinge element 53 is rigidly connected to the spider 51, while the hinge element 54 is adapted to be connected to the cooking top of an electric range, or the like, so as to mount the hotplate 50 for hinged movements into and out of an associated opening provided in the cooking top and between corresponding working and cleaning positions.

The incorporation of the heating unit 10 in the hotplate 50, particularly when the latter is employed in an electric range that is provided with automatic cooking control facility, is very advantageous as the heating unit 10 is capable of developing a wide range of heating rates, as previously explained, while preserving the great advantage of quick response to energization and de-energization, due to the small mass thereof. This feature is very important as it avoids the temperature-time lag inherent in conventional heating units of the plural heating element type that are of large mass. As a practical matter, these important structural features of the heating unit 10 are rendered feasible from the standpoint of manufacture by the present method, since heretofore there has not been known any method by which such a heating unit employing a plurality of helical heating elements involving such close spacings might be made; whereby large sheaths have been necessary in such conventional heating units to accommodate the required spacing of the helical heating elements. Fundamentally, the present method substantially completely removes the possibility of short-circuiting of the helical heating elements during the compressing or compacting step of the manufacturing operation, since the required spacings of the turns of the helical resistance elements or conductors are positively established in the previously produced heater assembly.

Referring now to Figs. 3 and 4, a modified form of the electric heating unit 110 is there illustrated that is quite similar to the electric heating unit 10 of Figs. 1 and 2, except that the heater assembly 112 comprises only two electric heating elements 123 and 124, together with the lead conductor 121 and the resilient sleeve 122 of fibrous insulating material of the character previously described. Also, in this arrangement, the separate electrical terminals are altogether eliminated by the mere utilization of the ends 121a, 123a and 124a of the lead conductor 121 and the heating elements 123 and 124 for this purpose. Also, in the heating unit 110, it is contemplated that the opposite ends of the sheath 111 are provided with enlarged end bells 11a to accommodate the desired spacings of the conductive ends or terminals 121a, 123a and 124a and the reception of the associated locating electrical insulating plugs 114 and 115. Moreover, in the heating unit 110, it is contemplated that the opposite ends thereof are identical; whereby any junctions required are provided by exterior wiring or connections.

In making the heating unit 110, the manufacture of the heater assembly 112 is substantially the same as that of the heater assembly 12; however, the finishing of the heating unit 110 is somewhat different from that involved in finishing the heating unit 10 because of the provision of the end-bells 111a at the opposite ends of the sheath 111. This structure may be obtained in a number of ways. For example, in the rolling step, the travel of the sheath 111 may be restricted so that only the intermediate portion thereof moves through the cooperating rolling passes; whereby the formation of the enlarged end-bells 111a merely follows from the reduction of the intermediate portion of the sheath 111, the end-bells 111a being of the initial diameter of the sheath. On the other hand, the opposite ends of the sheath 111 may be actually expanded following the rolling step employing a suitable tapered mandrel. As a matter of fact, a combination of these steps is recommended; whereby the intermediate portion of the sheath 111 is of smaller diameter than the initial diameter of the tubular stock from which it was formed, and the end-bells 111a are of larger diameter than the initial diameter of the tubular stock mentioned. Finally, the plugs 114 and 115 are pressed into the end-bells 111a to effect the desired compression of the granular material 113 in the transition sections of the sheath 111 joining the end-bells 111a.

In view of the foregoing description of the heating units 10 and 110, it will be understood that any reasonable number of individual electric heating elements may be carried in multifilar relation upon the associated resilient insulating sleeve, with the centrally disposed lead conductor in supporting relation with the associated insulating sleeve, and that this wide variation in the construction of the heater assembly imposes only a small modification of the required manufacturing steps. Moreover, the further processing of the assembly in the combined loading and tamping machine and subsequently in the rolling machine is substantially independent of the character and construction of the heater assembly; whereby the number of manufacturing steps required are greatly minimized, notwithstanding the production of a great variety of individual heating units. This economy in manufacture is exceedingly important and represents a tremendous advancement in the art, as it renders it feasible to manufacture a wide variety of heating units to the exact specifications of design engineers, thereby removing an artificial limitation that has been heretofore imposed upon them with reference to availability of sizes and ratings of such heating units. In other words, heretofore it has been impractical to manufacture a few thousand heating units of an odd or peculiar rating that might be required by the new design of an article of manufacture that is sold only in such volume; whereby the design engineer has been compelled to the specification of a heating unit that is manufactured in large volume for another purpose, which heating unit is not ideal for use in the new design of the article mentioned. The present method removes these limitations, since it is capable of great flexibility, without corresponding tool costs; whereby the design of many articles of manufacture will greatly benefit therefrom.

In view of the foregoing it is apparent that there has been provided an electric heating unit of improved and simplified construction and arrangement, which possesses great flexibility as to sizes, ratings, etc., and that is most advantageous for incorporation into a wide variety of electric hotplates for use in electric ranges, or the like.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. An electric heating unit comprising an elongated compressible heater assembly, an elongated tubular metallic sheath enclosing said heater assembly, and an elongated tubular dense layer of electrical-insulating and heat-conducting material arranged in said sheath and embedding said heater assembly and retaining the same in a highly compressed state and maintaining the same in spaced relation with respect to said sheath; said heater assembly comprising an elongated substantially centrally disposed lead conductor, an elongated tubular sleeve formed of filaments of electrical-insulating material surrounding said lead conductor and supported thereby, an elongated helical resistance conductor wound upon and supported by said sleeve, said sleeve retaining said lead conductor and said resistance conductor in spaced-apart relation, one end of said lead conductor being connected to one end of said resistance conductor adjacent to one end of said sheath and the other end of said lead conductor projecting from the other end of said sheath as a first electrical terminal, and a second electrical terminal connected to the other end of said resistance conductor and projecting from said other end of said sheath.

2. The electric heating unit set forth in claim 1, wherein the material of said sleeve consists essentially of silica, also containing small quantities of non-siliceous glass-forming metal oxides, chiefly aluminum oxide, said last-mentioned material being further characterized by a ratio of the silica to the metal oxides in excess of 9 and by a melting point in excess of 1950° F.

3. An electric heating unit comprising an elongated compressible heater assembly, an elongated tubular metallic sheath enclosing said heater assembly, and an elongated tubular dense layer of electrical-insulating and heat-conducting material consisting essentially of magnesium oxide and arranged in said sheath and embedding said heater assembly and retaining the same in a highly compressed state and maintaining the same in spaced relation with respect to said sheath; said heater assembly comprising an elongated substantially centrally disposed lead conductor, an elongated sleeve in the form of a bundle of filaments of electrically-insulating material surrounding said lead conductor and supported thereby, said last-mentioned material consisting essentially of silica, also containing small quantities of non-siliceous glass-forming metal oxides, chiefly aluminum oxide, said last mentioned material being further characterized by a ratio of the silica to the metal oxides in excess of 9 and by a melting point in excess of 1950° F., an elongated helical resistance conductor wound upon and supported by said sleeve, said sleeve retaining said lead conductor and said resistance conductor in spaced-apart relation, one end of said lead conductor being connected to one end of said resistance conductor adjacent to one end of said sheath and the other end of said lead conductor projecting from the other end of said sheath as a first electrical terminal, and a second electrical terminal connected to the other end of said resistance conductor and projecting from said other end of said sheath.

4. An electric heating unit comprising an elongated compressible heater assembly, an elongated tubular metallic sheath enclosing said heater assembly, and an elongated tubular dense layer of electrical-insulating and heat-conducting material arranged in said sheath and embedding said heater asesmbly and retaining the same in a highly compressed state and maintaining the same in spaced relation with respect to said sheath; said heater assembly comprising an elongated substantially centrally disposed lead conductor, an elongated tubular sleeve formed of filaments of electrical-insulating material surrounding said lead conductor and supported thereby, a plurality of elongated helical resistance conductors wound upon and supported by said sleeve, said resistance conductors being inter-wound in plural-filar relation so that between each two adjacent turns of any one of said resistance conductors there is disposed a turn of each other of said resistance conductors, said sleeve retaining said lead conductor and said resistance conductors in mutually spaced-apart relation, one end of said lead conductor being connected to one end of each of said resistance conductors adjacent to one end of said sheath and the other end of said lead conductor projecting from the other end of said sheath as a first electrical terminal, and a plurality of second electrical terminals respectively connected to the other ends of said resistance conductors and respectively projecting from said other end of said sheath.

References Cited in the file of this patent

UNITED STATES PATENTS

| | | |
|---|---|---|
| 1,359,400 | Lightfoot | Nov. 16, 1920 |
| 2,180,580 | Clark | Nov. 21, 1939 |
| 2,199,879 | Deroche | May 7, 1940 |
| 2,538,977 | Mucher | Jan. 23, 1951 |